(12) United States Patent
Chudoba et al.

(10) Patent No.: US 10,078,185 B2
(45) Date of Patent: *Sep. 18, 2018

(54) MECHANICAL FIBER SWITCH

(71) Applicant: Nu Visions International, Inc., Milford, PA (US)

(72) Inventors: Paul Chudoba, Milford, PA (US); Michael Coppola, Auburn, NY (US)

(73) Assignee: Nu Visions International, Inc., Milford, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/845,261

(22) Filed: Dec. 18, 2017

(65) Prior Publication Data
US 2018/0120511 A1 May 3, 2018

Related U.S. Application Data

(63) Continuation-in-part of application No. 15/073,057, filed on Mar. 17, 2016, now Pat. No. 9,880,358.

(51) Int. Cl.
*G02B 6/26* (2006.01)
*G02B 6/35* (2006.01)
*G02B 6/293* (2006.01)
*H04Q 11/00* (2006.01)

(52) U.S. Cl.
CPC ....... *G02B 6/3546* (2013.01); *G02B 6/29373* (2013.01); *G02B 6/3508* (2013.01); *H04Q 11/0001* (2013.01)

(58) Field of Classification Search
CPC .......... G02B 6/3546; G02B 6/29373; G02B 6/3508; H04Q 11/0001
USPC .................................................. 385/15–24
See application file for complete search history.

(56) References Cited

U.S. PATENT DOCUMENTS

| | | | | |
|---|---|---|---|---|
| 4,239,331 A * | 12/1980 | Aoyama | ............. | G02B 6/3524 385/16 |
| 4,834,488 A * | 5/1989 | Lee | ...................... | G02B 6/3504 385/20 |
| 4,955,686 A * | 9/1990 | Buhrer | ..................... | G02B 6/32 385/17 |
| 5,033,813 A * | 7/1991 | Westfall | ............... | G02B 6/3504 385/16 |
| 5,110,194 A * | 5/1992 | Zurfluh | ................ | G02B 6/3502 385/16 |
| 5,796,888 A * | 8/1998 | Furukawa | ............ | G02B 6/3508 385/20 |
| 5,920,665 A * | 7/1999 | Presby | ................ | G02B 6/3508 385/16 |

(Continued)

*Primary Examiner* — Ryan Lepisto
*Assistant Examiner* — Guy Anderson
(74) *Attorney, Agent, or Firm* — Bond Schoeneck & King, PLLC; George McGuire (57) ABSTRACT

A switch for selectively coupling light from two input fibers to a selected two of plurality of output optical fibers. The switch was designed to handle standard Fiber optical connectors which have been polished and meet the specifications for the optical performance. The duplex mechanical switch creates a method to physically switch two fibers (Duplex) to another two fibers (Duplex). The performance regarding insertion losses, back reflection, crosstalk, immunity against backscattering of light and insensitivity to the wavelength of the light is consistent with this mechanical switch.

14 Claims, 7 Drawing Sheets

(56) References Cited

U.S. PATENT DOCUMENTS

| | | | | |
|---|---|---|---|---|
| 6,819,816 | B2* | 11/2004 | Noda | G02B 6/3508 |
| | | | | 385/16 |
| 6,903,494 | B2* | 6/2005 | Noda | G02B 6/3508 |
| | | | | 310/12.19 |
| 2002/0141691 | A1* | 10/2002 | Ueno | G02B 6/3508 |
| | | | | 385/22 |
| 2002/0150325 | A1* | 10/2002 | Noda | G02B 6/3508 |
| | | | | 385/16 |
| 2003/0231820 | A1* | 12/2003 | Chiba | G02B 6/262 |
| | | | | 385/16 |
| 2004/0022484 | A1* | 2/2004 | Sigloch | G02B 6/3574 |
| | | | | 385/22 |
| 2004/0028322 | A1* | 2/2004 | Sprague | G02B 6/3508 |
| | | | | 385/23 |
| 2004/0046625 | A1* | 3/2004 | Fukushima | G02B 6/3572 |
| | | | | 335/270 |
| 2004/0057654 | A1* | 3/2004 | Baasch | G02B 6/3572 |
| | | | | 385/16 |
| 2004/0195939 | A1* | 10/2004 | Noda | G02B 6/3508 |
| | | | | 310/328 |
| 2012/0087622 | A1* | 4/2012 | Zalitzky | G02B 6/3504 |
| | | | | 385/20 |

\* cited by examiner

| PERFORMANCE | | |
| --- | --- | --- |
| PARAMETER | EXISTING | MFS |
| LOSS (DUAL BAND) | 1.2 dB | 0.3 dB |
| BACK REFLECTION | -50dB MAX | -65dB MAX |
| CROSSTALK | -50dB MAX | -65dB MAX |
| FIBER TYPE | SM | SM, MM, OM3 |
| | | |

MECHANICAL FIBER SWITCH

CROSS-REFERENCE TO RELATED APPLICATION

This application is a continuation-in-part of U.S. patent application Ser. No. 15/073,057, filed Mar. 17, 2016, the entirety of which is hereby incorporated by reference.

FIELD OF THE INVENTION

The present disclosure relates generally to optical switches and more particularly toward an improved mechanical switch for selectively coupling light from two input fibers to a selected two of a plurality of output optical fibers.

BACKGROUND

In order to realize the potential of fiber optic transmission of light signals, some form of switching mechanism must be provided for moving light signals from one fiber to another. In principle, mechanical switches have a number of advantages over other forms of optical switches for applications in which switching speed is not important. Mechanical switches offer low insertion losses, a high degree of immunity against backscattering of light from the switch back down the input fiber, low cross-talk, and insensitivity to the wavelength of the light being switched.

Prior mechanical switches, however, have been too costly to achieve full market acceptance. Typically, these switches operate by moving an input fiber relative to a plurality of output fibers. The simplest schemes utilize a "butt-coupling" scheme in which the input fiber is aligned with one of a plurality of output fibers using a motor. The output fibers are usually fixed to a carrier and have ends cut at an angle to prevent reflections from the ends generating reflections that propagate back down the input fiber. The angle is typically 6 to 10 degrees.

To provide acceptable insertion losses, the ends of the fiber in a butt-couple switch must be separated by an extremely small distance. This tolerance is difficult to achieve in switches having a large number of output fibers. Hence, butt-coupling schemes, while appearing simple, are in reality extremely difficult and challenging to implement in large fan-out switches.

Accordingly, there is a long-felt yet unsolved need in the art for a mechanical switch that selectively couples light from two input fibers to a selected two of a plurality of output optical fibers, without using lenses or beam collimators.

SUMMARY OF THE INVENTION

The present disclosure is directed to inventive fiber optic switches. Embodiments of the invention fiber optic switches described or otherwise envisioned herein include a switch for selectively coupling light from two input fibers to a selected two of a plurality of available output optical fibers. The switch is able to use standard fiber optical connectors which meet the specifications for optical performance. The duplex mechanical switch creates a method to physically switch two fibers (duplex) to another two fibers (duplex). With the improved fiber optic switches, it is possible to move light signals from one fiber to another with low insertion losses, a high degree of immunity against backscattering of light from the switch back down the input fiber, low cross-talk, and insensitivity to the wavelength of the light being switched.

According to an aspect, a fiber optic switch device includes: (i) a plurality of output optical fibers, each having an output fiber first end; (ii) a slider assembly moveable between a first position and a second position, the slider assembly comprising a first input fiber and a second input fiber, each having an input fiber first end, and a pair of steering pins and a driver pin each extending outwardly; (iii) a program plate defining at least two interconnected channels, into which the driver pin and the pair of steering pins, are inserted, wherein the driver pin and the pair of steering pins are moveable within the at least two interconnected channels from said first position to said second position; (iv) wherein in the first position, the first ends of the first and second input fibers are aligned and in light-transmissive communication with the output fiber first end of a first two of the plurality of output optical fibers; and (v) wherein in the second position, the first ends of the first and second input fibers are aligned and in light-transmissive communication with the output fiber first end of a second two of the plurality of output optical fibers.

These and other aspects and embodiments of the invention will be described in greater detail below, and can be further derived from reference to the specification and figures.

BRIEF DESCRIPTION OF THE DRAWINGS

The present invention will be more fully understood and appreciated by reading the following Detailed Description in conjunction with the accompanying drawings, in which.

DETAILED DESCRIPTION OF EMBODIMENTS

Figure 1A:
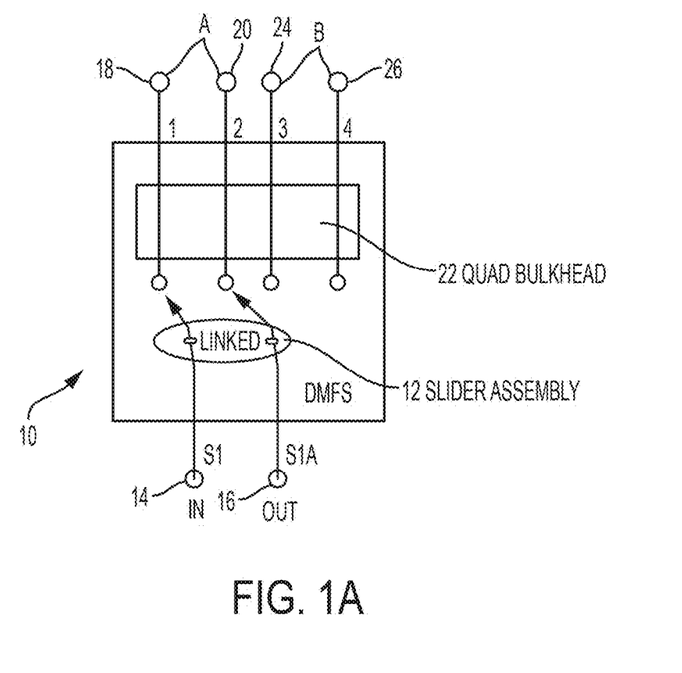
FIG. 1A is a schematic of a duplex mechanical fiber switch ("DMFS") in a first position in accordance with an embodiment.
Figure 1B:
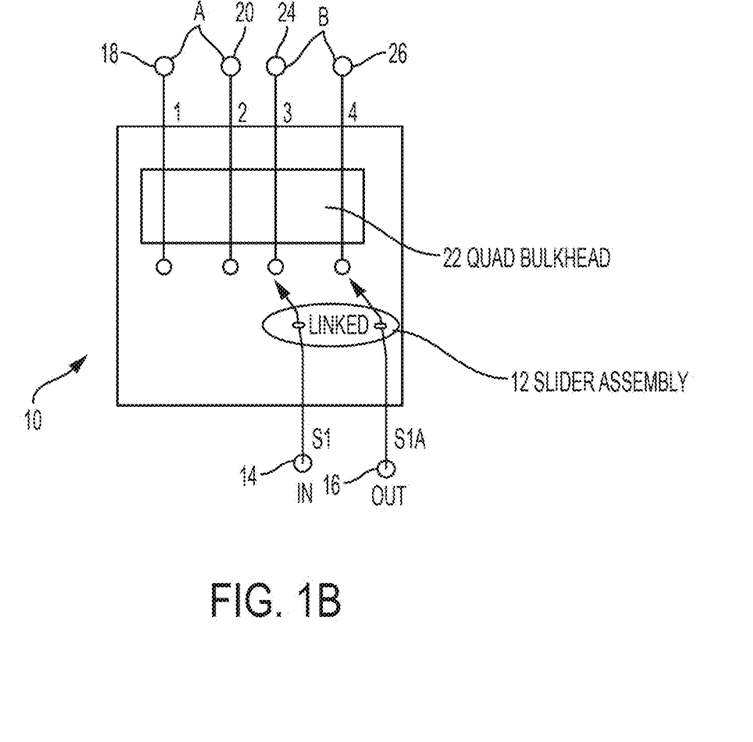
FIG. 1B is a schematic of a duplex mechanical fiber switch ("DMFS") in a second position in accordance with an embodiment.

Referring now to the drawings, wherein like reference numerals refer to like parts throughout, there is seen in FIG. 1A a schematic of a DMFS 10 in a first position. The DMFS 10 has a slider assembly 12 consisting of S1 14 and S1A 16. Slider assembly 12 is shown in position "A," which connects the slider to pins 18 and 20 on the Quad Bulkhead 22. When the slider assembly 12 moves to position "B," as shown in FIG. 1B, the slider assembly connects to pins 24 and 26 on the Quad Bulkhead 22. The configuration illustrated is a 2×2 mechanical switch (duplex).

Figure 2:
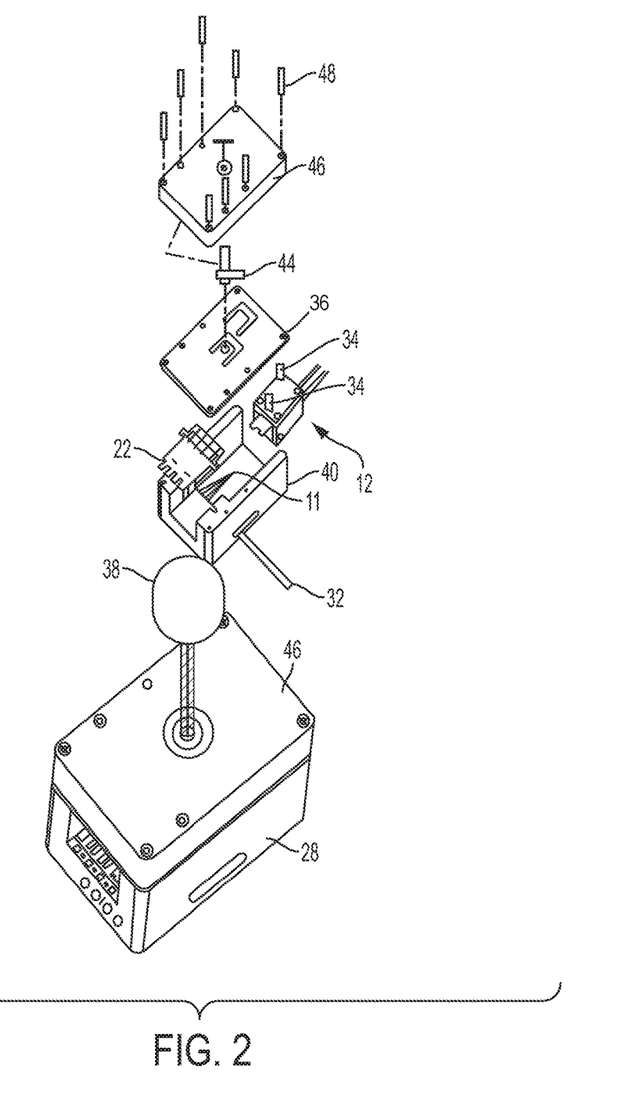
FIG. 2 is an exploded view of a fiber switch ("MFS") assembly layout in accordance with an embodiment.
Figure 3:
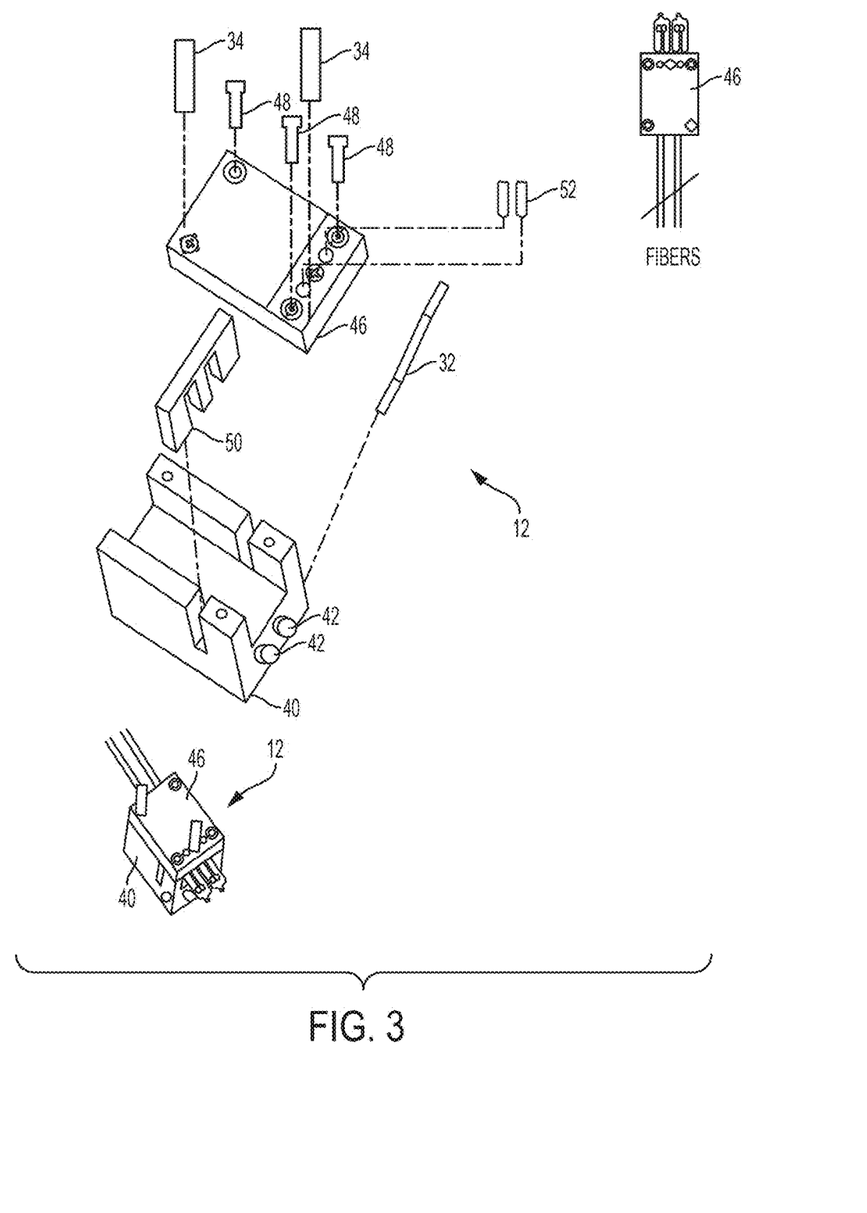
FIG. 3 is an exploded view of the slider assembly of an MFS in accordance with an embodiment.

Referring now to FIG. 2 is an exploded view of the components of a DMFS 10. The DMFS 10 comprises a Quad MFS Housing Bottom 28. Quad Housing Bottom 28 contains the Quad Bulkhead 22 and the Steel Flat Head Screws 30 beneath the Quad Bulkhead 22. The slider assembly 12 provides the physical movement in the X and Y directions. Slider assembly 12 contains two LC/APC connectors which are used to provide the mating in the two positions. A stainless bar 32 is used to move the slider assembly 12 in the X or Y direction. There are two pins 34 on top of the slider, as shown in FIG. 3, which are used with the Program Plate 36 above, to insure the direction of travel when the knob and shaft 38 is turned. The front of the bottom 40 of the slider 12, as shown in FIG. 3, has two magnets 42 beneath each connector which are used to "snap" the connectors into the Quad Bulkhead 22 where the steel flat head screws 30 are located below in FIG. 2. The two magnets 42 also provide stability and consistency to the ferrules. The double cam assembly 44 provides a unique movement for the slider 12 in the X and Y direction via the Program Plate 36. The Quad DMS Housing Top 46 has all of the screws 48 to secure the module.

Referring now to FIG. 3 is an exploded view of the components for the slider assembly 12. It can comprise, for example, a bottom housing 40 which contains the stainless steel bar 32 along with the two magnets 42. The Connector Retainer Clip 50 holds the two connectors in place. It is important to note that the Connector Retainer Clip 50 also provides added flexibility for the connector housings when inserting into the mating bulkhead. In order to maintain consistency, regarding losses of light, the connector housings are isolated in order to keep the ferrules mating tension consistent when the magnetic field is sensed. The two set screws 52 are used to stabilize the connector housings. The two dowel pins 34 are used to position the slider assembly 12 based on the program plate 36 shown in FIG. 2. The top plate 46 is used to secure to the bottom housing 40 with the three screws 48. The top plate 46 also holds the dowel pins 34 and the connector adjusting screws 52.

Figure 4:
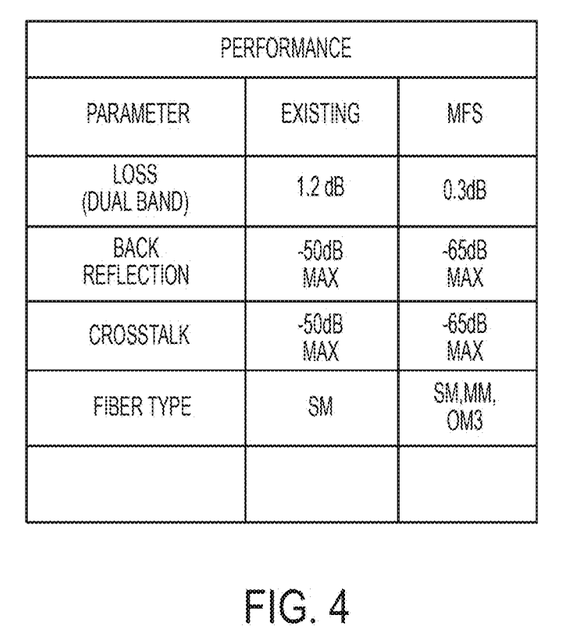
FIG. 4 is a table illustrating the performance of existing hybrid switches compared to the DMFS.

Referring now to FIG. 4 is a performance table illustrating various parameters including as Loss, back reflection, crosstalk and fiber type. The "Existing" column contains information about typical measurements of all of the parameters of existing switches on the market. The "MFS" Mechanical Fiber Switch column is measurements using the DMFS. The measurement results are significant because the MFS is a "true mechanical fiber switch" which uses standard mating connectors and mating bulkheads. Some of the advantages of the MFS consist of manual switching without any external power. Low loss based on ferrule to ferrule contact which are using the magnets to provide a consistent balance and attraction for the ferrules. Repetitive connections are also consistent when the loss is measured because of the added magnet attraction for stability. Various types of fiber can be used such as single mode, multi-mode, along with the added specialty fiber on the market. The crosstalk continues to be very high because of the isolation of the connectors.

Figure 5:
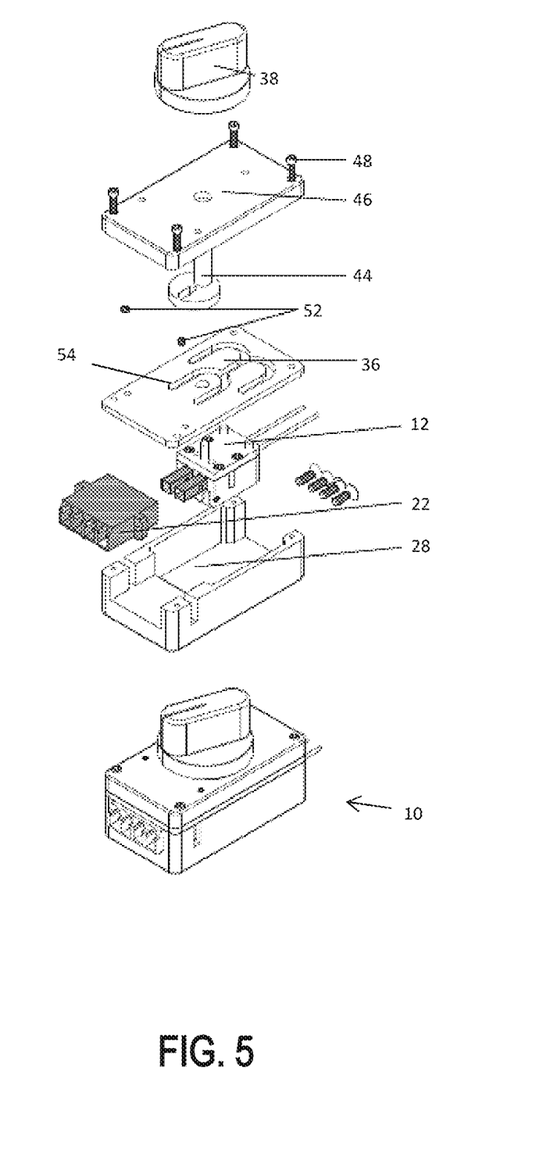
FIG. 5 is an exploded view of a fiber switch ("MFS") assembly layout in accordance with an alternative embodiment.
Figure 6:
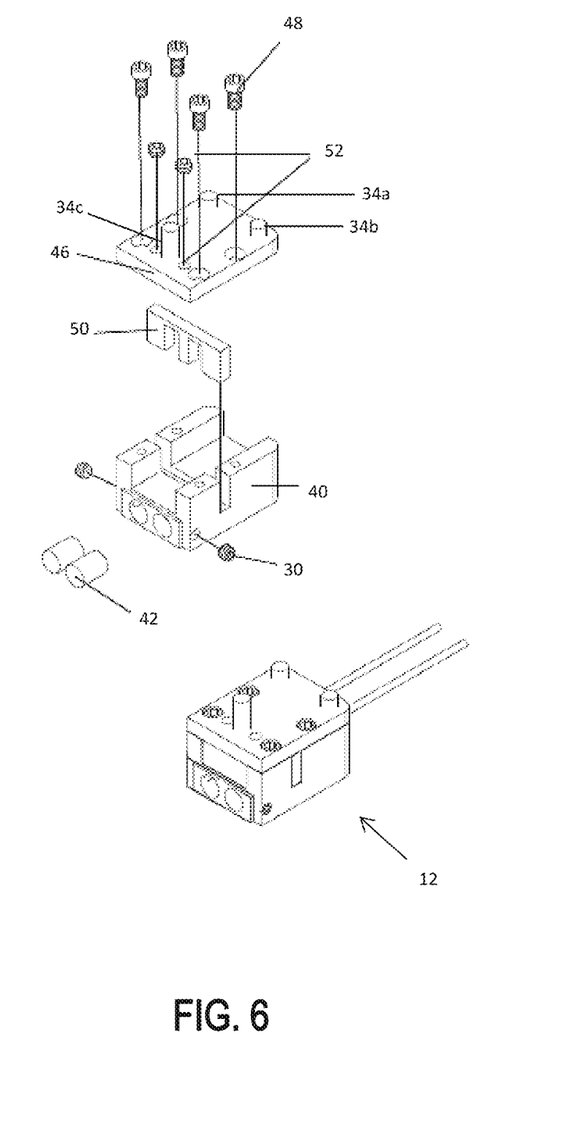
FIG. 6 is an exploded view of a slider assembly of an MFS in accordance with an additional embodiment.

Turning now to FIGS. 5-6, there are shown exploded views of the components of an alternative embodiment of the DMFS 10 and slider assembly 12, respectively. According to the alternative embodiment in FIGS. 5-6, the stainless steel bar 32 is eliminated from the slider assembly 12. As shown, the Program Plate 36 in FIG. 2 can be modified to incorporate an additional pin guide, as the Program Plate 36 shown in FIG. 5. The Program Plate 36 or board in FIG. 5 comprises an additional horseshoe guide as compared to the Program Plate 36 in FIG. 2. In addition, the horseshoe guides in the Program Plate 36 of FIG. 5 are interconnected, creating a pin guide with an interconnected triple horseshoe pattern 54.

Referring now to FIG. 6, an alternative embodiment of the top plate 46 of the slider assembly can be seen. To correspond to the interconnected triple horseshoe pattern 54 of the Program Plate 36, a third dowel pin 34a (shown in FIG. 6) is added to the slider assembly 12 of FIG. 2. The alternative embodiment of the Program Plate 36 comprises a total of three pins 34a-c in a triangle configuration. The triangular configuration of the pins 34a-c is important to navigate the slider assembly 12 without the stainless steel bar 32 (shown in FIGS. 2-3). The pin 34c, which is on the top center of the slider assembly 12, is connected to the double cam assembly 44 and is thus considered to be the "Driver Pin" 34c. The remaining two pins 34a, 34b that are directly behind the "Driver Pin" 34c are the "Steering Pins" 34a, 34b, which are used to guide the slider 12 in the various directions like a wheel barrel.

In use, the three pins 34a-c are configured to work with the Program Plate 36 and follow the interconnected triple horseshoe pattern 54, with one of the pins 34a-c in each of the horseshoes. The triple horseshoe pattern 54 provides a more consistent movement for the slider assembly 12 due to the triangular configuration and wheel-barrel-like motion of the three pins 34a-c. In comparison to a wheel barrel, the single Driver Pin 34c is the wheel and the other two Steering Pins 34a-b are the handles of the wheel barrel used for steering the wheel (Driver Pin 34c) in any direction.

Although the present invention has been described in connection with a preferred embodiment, it should be understood that modifications, alterations, and additions can be made to the invention without departing from the scope of the invention as defined by the claims.

What is claimed is:

1. An optical fiber switch device comprising:
   a plurality of output optical fibers, each having an output fiber first end;
   a slider assembly moveable between a first position and a second position, the slider assembly comprising: (i) a first input fiber and a second input fiber, each having an input fiber first end; (ii) a pair of steering pins and a driver pin each extending outwardly;
   a program plate defining at least two interconnected channels, into which the driver pin and the pair of steering pins, are inserted, wherein the driver pin and the pair of steering pins are moveable within the at least two interconnected channels from said first position to said second position;
   wherein in the first position, the first ends of the first and second input fibers are aligned and in light-transmissive communication with the output fiber first end of a first two of the plurality of output optical fibers; and
   wherein in the second position, the first ends of the first and second input fibers are aligned and in light-transmissive communication with the output fiber first end of a second two of the plurality of output optical fibers.

2. The optical fiber switch device according to claim 1, wherein said at least two interconnected channels are three interconnected horseshoe shaped channels.

3. The optical fiber switch device according to claim 2, wherein said three interconnected horseshoe shaped channels are arranged in a triangular configuration.

4. The optical fiber switch device according to claim 3, wherein said driver pin and said steering pins are arranged in a triangular configuration.

5. The optical fiber switch device according to claim 4, wherein said triangular configuration of said three interconnected horseshow shaped channels is aligned with said triangular configuration of said driver pin and said steering pins, such that one of said driver pin and said steering pins is positioned in positioned in each of said three interconnected horseshoe shaped channels.

6. The optical fiber switch device according to claim 1, wherein movement of said steering pins from said first position to said second position drives movement of said driver pin from said first position to said second position.

7. The optical fiber switch device according to claim 1, further comprising first and second magnets attached to said slider assembly.

8. The optical fiber switch device according to claim 1, further comprising a bulkhead having first and second inputs to which said first input fiber and said second input fiber optically connect, respectively, and first, second, third and fourth outputs.

9. The optical fiber switch device according to claim 8, further comprising a bulkhead housing having a lower housing and an upper housing that collectively house said bulkhead.

10. The optical fiber switch device according to claim 9, wherein said bulkhead lower housing comprises first and second elongated slots formed therein.

11. The optical fiber switch device according to claim 10, further comprising a connector retaining clip removably mounted to said bulkhead lower housing and positioned within said first and second elongated slots.

12. The optical fiber switch device according to claim 1, further comprising a cam attached to said program plate.

13. The optical fiber switch device according to claim 12, further comprising a knob and shaft attached to said cam.

14. The optical fiber switch device according to claim 12, wherein the cam is attached to the driver pin.

\* \* \* \* \*

UNITED STATES PATENT AND TRADEMARK OFFICE
CERTIFICATE OF CORRECTION

PATENT NO. : 10,078,185 B2  
APPLICATION NO. : 15/845261  
DATED : September 18, 2018  
INVENTOR(S) : Paul Chudoba and Michael Coppola Page 1 of 1

It is certified that error appears in the above-identified patent and that said Letters Patent is hereby corrected as shown below:

In the Claims

Column 5, Line 2, Claim 5 please delete the second set of words "positined in" before the word "each"

Signed and Sealed this
Twentieth Day of November, 2018

Andrei Iancu
*Director of the United States Patent and Trademark Office*